No. 882,663. PATENTED MAR. 24, 1908.
F. BARTHOLD.
CORKING MACHINE.
APPLICATION FILED MAR. 12, 1907.

6 SHEETS—SHEET 1.

No. 882,663. PATENTED MAR. 24, 1908.
F. BARTHOLD.
CORKING MACHINE.
APPLICATION FILED MAR. 12, 1907.

6 SHEETS—SHEET 2.

No. 882,663. PATENTED MAR. 24, 1908.
F. BARTHOLD.
CORKING MACHINE.
APPLICATION FILED MAR. 12, 1907.
6 SHEETS—SHEET 4.

Witnesses:
Fred Palm
George Felber

Inventor
Ferdinand Barthold
By Oliphant & Young
Attorneys

No. 882,663. PATENTED MAR. 24, 1908.
F. BARTHOLD.
CORKING MACHINE.
APPLICATION FILED MAR. 12, 1907.

6 SHEETS—SHEET 5.

Witnesses:
Fred Palm
George Felber

Inventor:
Ferdinand Barthold.
By Oliphant & Young
Attorneys.

No. 882,663. PATENTED MAR. 24, 1908.
F. BARTHOLD.
CORKING MACHINE.
APPLICATION FILED MAR. 12, 1907.

6 SHEETS—SHEET 6.

Witnesses:
Fred Palm
George Felber

Inventor:
Ferdinand Barthold
By Oliphant & Young
Attorneys.

UNITED STATES PATENT OFFICE.

FERDINAND BARTHOLD, OF MILWAUKEE, WISCONSIN, ASSIGNOR TO THE VILTER MANUFACTURING COMPANY, OF MILWAUKEE, WISCONSIN.

CORKING-MACHINE.

No. 882,663.      Specification of Letters Patent.      Patented March 24, 1908.

Application filed March 12, 1907. Serial No. 362,008.

*To all whom it may concern:*

Be it known that I, FERDINAND BARTHOLD, a citizen of the United States, and resident of Milwaukee, in the county of Milwaukee and State of Wisconsin, have invented certain new and useful Improvements in Corking-Machines; and I do hereby declare that the following is a full, clear, and exact description thereof.

The invention consists in what is herein shown, described and claimed; its object being to provide simple, economical efficient and practically automatic machines for speedy corking of receptacles of various kinds, particularly wide-mouthed short neck bottles and jars, without damage to same, as well as to insure the proper setting of the corks in the receptacles and the expulsion of air from said receptacles above the contents of same as a result of the corking operations.

Figure 1:
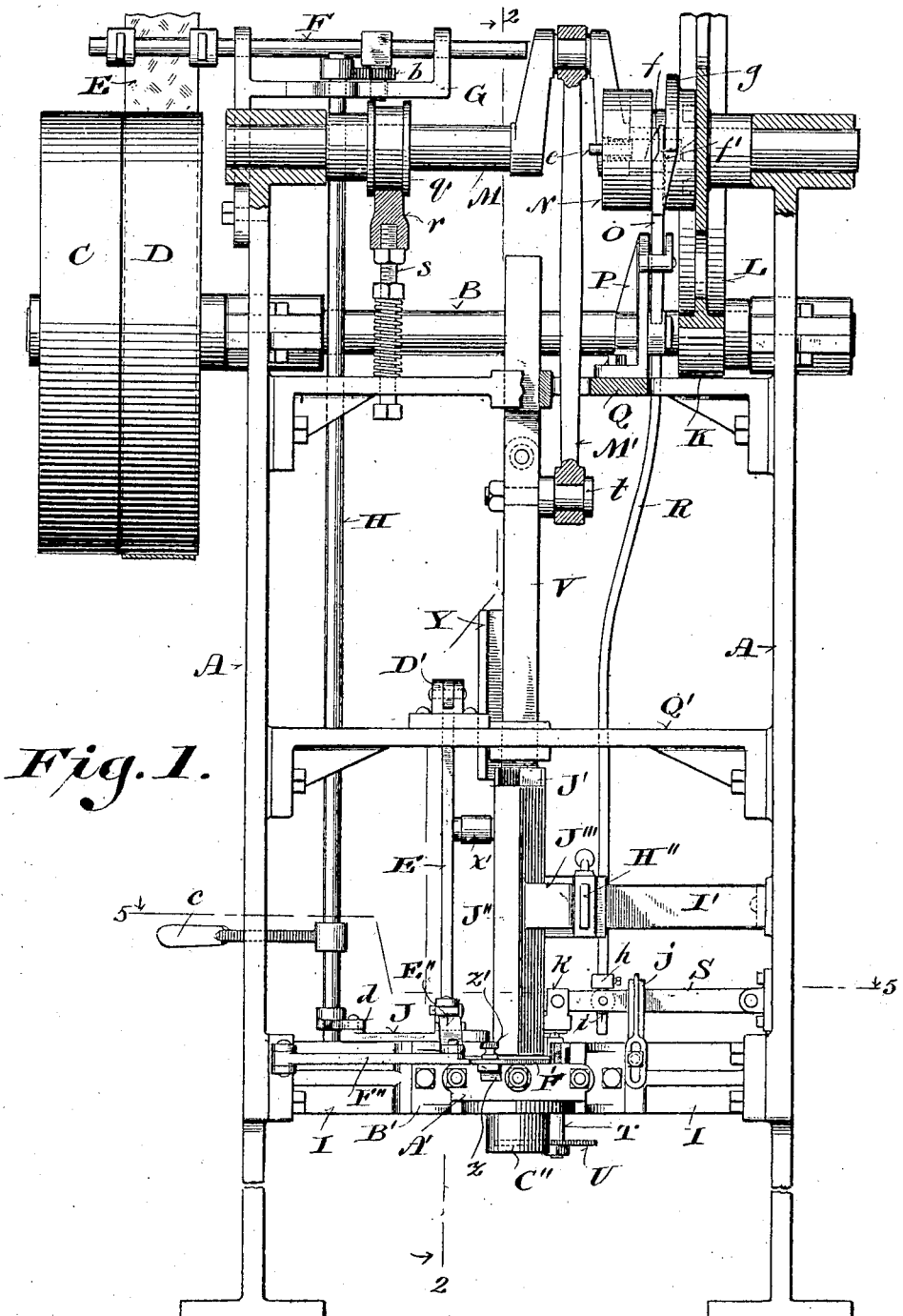
Figure 2:
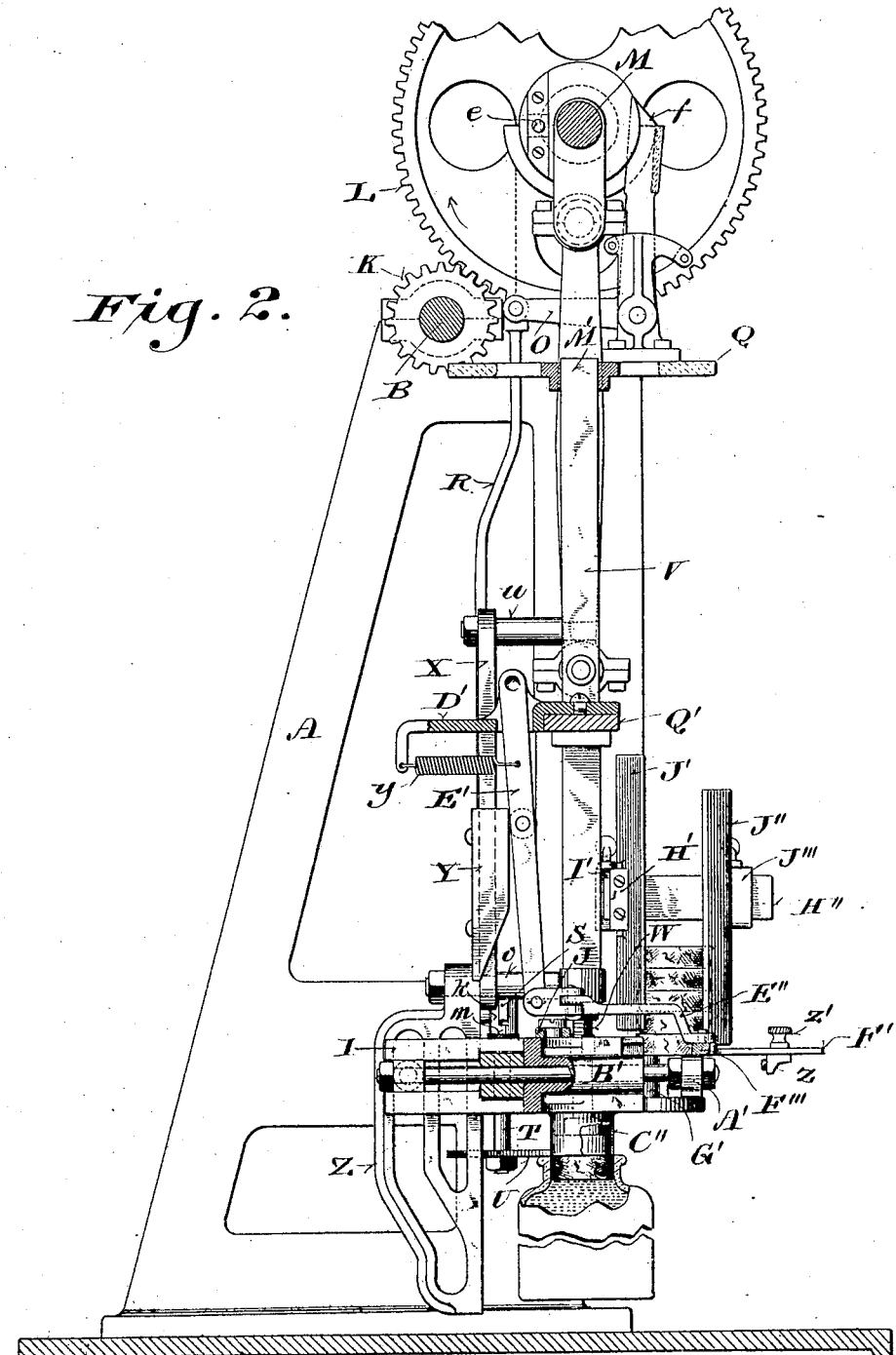
Figure 3:
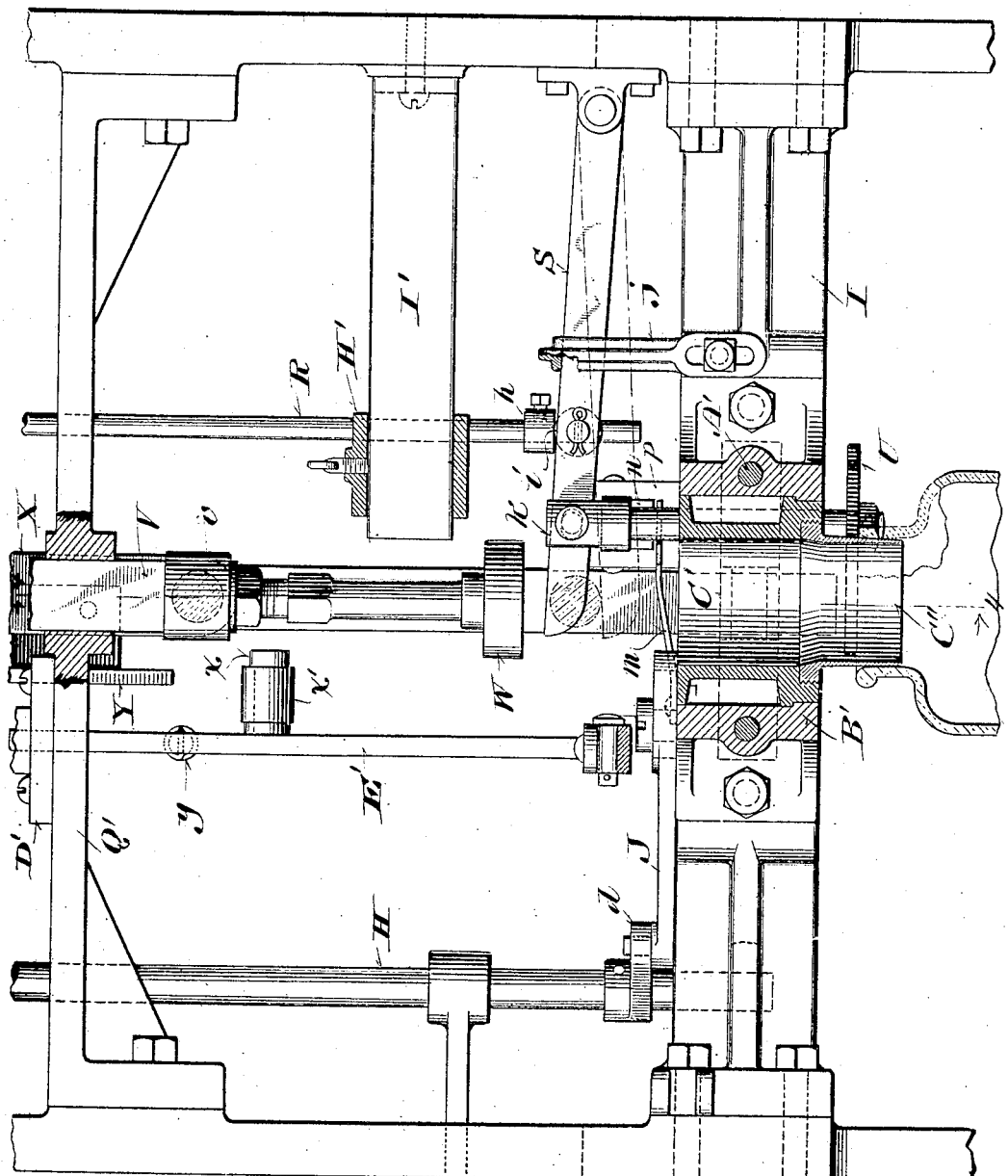
Figure 4:
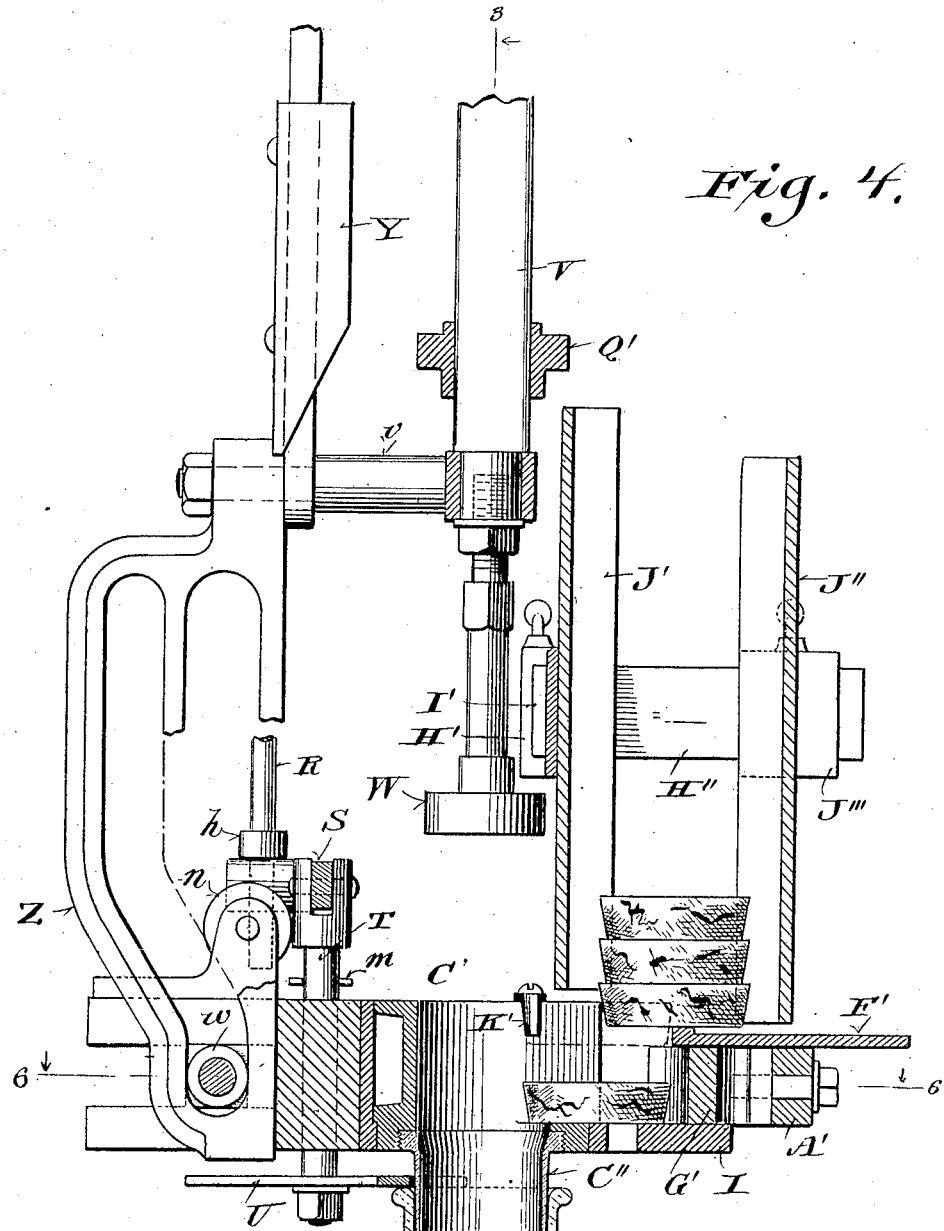
Figure 5:
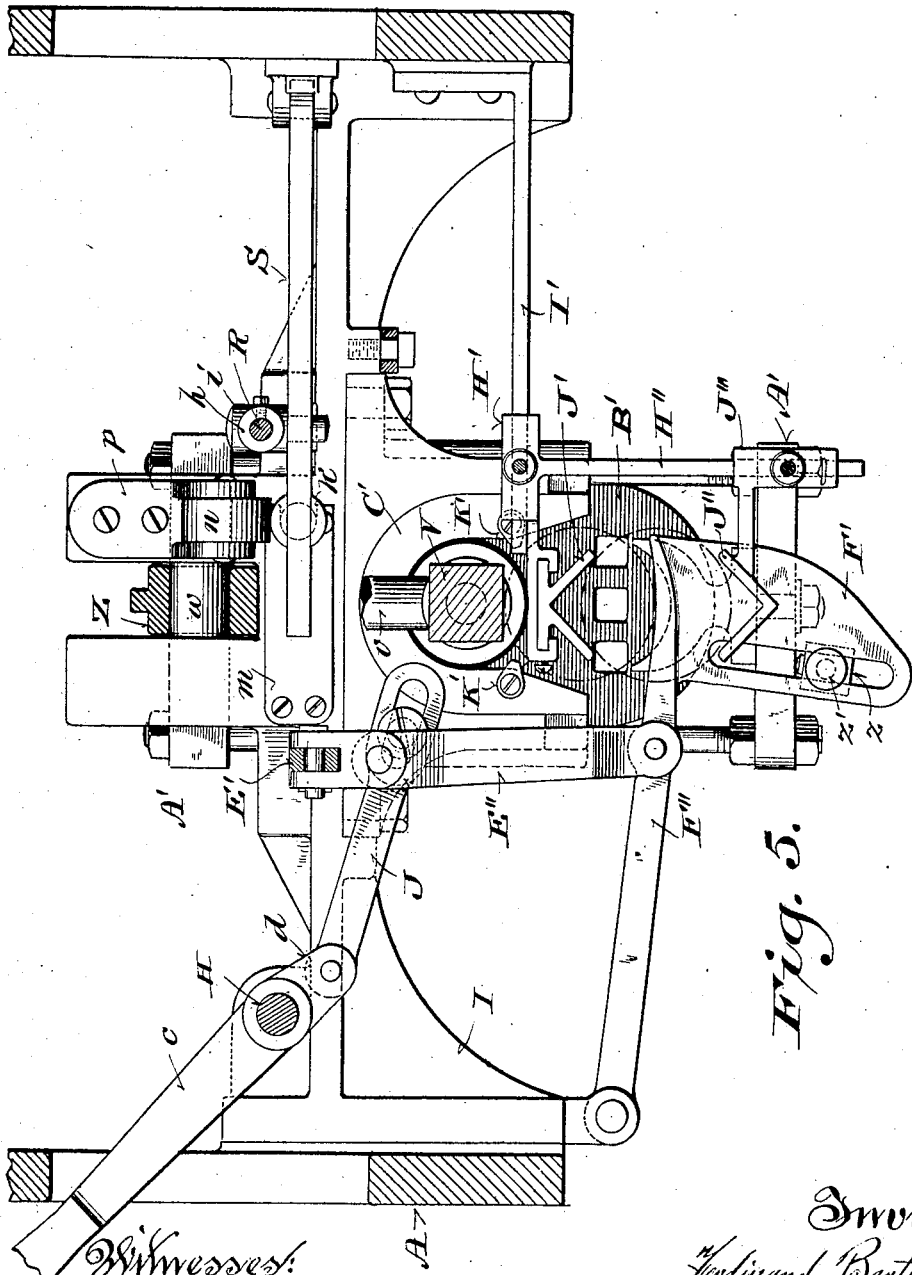
Figure 7:
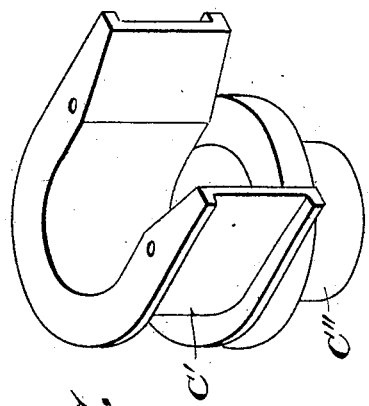
Figure 8:
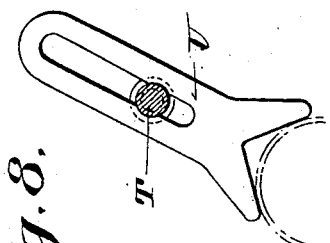
Figure 6:
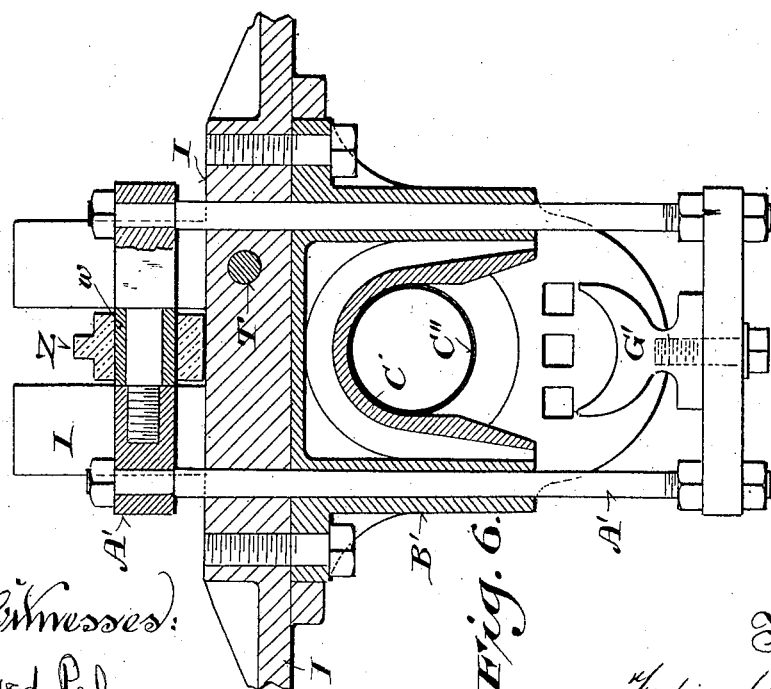

Figure 1 of the accompanying drawings represents a front elevation of my improved corking-machine having parts thereof broken away; Fig. 2, a sectional view of the machine indicated by line 2—2 in Fig. 1; Fig. 3, an enlarged detail view of a portion of the machine partly in section indicated by line 3—3 of the figure next in order; Fig. 4, a detail view of a portion of the machine partly in section on line 4—4 of Fig. 3; Fig. 5, a horizontal section view indicated by line 5—5 in Fig. 1; Fig. 6, a similar view indicated by line 6—6 in Fig. 4; Fig. 7, a perspective view of a fragment of the machine, and Fig. 8, a plan view of gage-plate in the machine, the same being in adjustable connection with a reciprocative stem shown in horizontal section.

Referring by letter to the drawings, A indicates each of the standards of the machine-frame that is provided with bearings for a drive-shaft B, having tight and loose pulleys C, D, in connection therewith for a power-transmission belt E controlled by an ordinary shifter. The shifter-rod F is guided in a bracket G attached to one of the aforesaid standards, and suitably coupled to a crank $b$ of a throw-rod H for which the bracket and bed-piece I of the machine are provided with bearings, a handle $c$ being employed in connection with said throw-rod. A slide J in pivotal connection with a lower crank $d$ of the throw-rod has the connection and function hereinafter described.

Fast on the drive-shaft is a spur-pinion K in mesh with a spur-wheel L normally loose on a crank-shaft M for which the standards A are provided with bearings, and a clutch N is fast on this crank-shaft. The clutch is provided with a spring-controlled bolt $e$, that has engagement with any one of a series of sockets with which the hub of the spur-wheel is provided, as shown by dotted lines in Fig. 1, said bolt being normally held in retracted position, by the engagement of a notch of same with the tripper-end $f$ of an arm of a bell-crank O that is fulcrumed in connection with a bracket P, this bracket being rigidly secured to a horizontal brace Q of the machine-frame. A portion of the bracket P is a segmental guide for the bolt-trip arm of the bell-crank O aforesaid. A semi-circular flange $g$ of the clutch is caught by a lateral extension $f'$ of the tripper-end of said bell-crank to prevent overrunning of said clutch when the bolt of same is retracted from a socket in said spur-wheel. The detail of the clutch-mechanism is immaterial, so far as my invention is concerned, and any suitable clutch-mechanism may be utilized to effect a union of the spur-wheel and crank-shaft aforesaid at the will of the operator of the machine.

A throw-rod R is shown in connection with the lower arm of the bell-crank O and provided with a set-collar $h$ opposing a stud $i$ loosely engaged by said rod and in pivotal connection with a lever S for which the machine-frame is provided with a fulcrum-block. The lift of the lever in proportion to the thickness of the corks is regulated by a vertically adjustable angular stop $j$, and shackled to said lever is the head $k$ of a shouldered stem T of a longitudinally slotted and forked gage-plate U, said stem being guided in the bed-piece I aforesaid. In the downward path of the stem-head $k$ is the forked free end of a leaf-spring $m$, the other end of this spring being fastened to said bed-piece. An anti-friction roller $n$ is mounted in a bracket $p$ on said bed-piece to oppose the head $k$ of the stem T and thereby steady vertical reciprocative motion of said stem.

To retard motion of the aforesaid crank-shaft, the same is provided with a friction-collar $q$ opposed by a shoe $r$ in adjustable screw-thread connection with a spring-supported stem *s* for which the frame-brace Q serves as a guide, it being suitably apertured, and said crank-shaft is connected, by a pitman M' with a stud *t* of a shank V for which said brace and a similar brace Q' are provided with guides. The stem of a plunger W has detachable and vertically adjustable engagement with the lower end of the shank V, and arms *u*, *v*, of said shank are joined by a vertical bar X to which a cam-plate Y is detachably connected. The supporting-spring for the stem *s* is tensioned by the adjustment of a nut on said stem. Hung on the lower arm *v* of the plunger-shank V is another cam-plate Z guided on an anti-friction roller *w* mounted in connection with one end of a cross-frame A' that is guided in the bed-piece I and a head-block B' bolted thereto, said cam-plate and cross-frame being reciprocative at right-angles to each other in a suitably recessed rear portion of said bed-piece. The lever S aforesaid is in the downward path of the shank-arm *v*, and set in said head-block is a partly cylindrical cork-receiver C' open at one side, this receiver being provided with a depending partly flaring nozzle C'', said cork-receiver being flanged to rest upon seats provided in the head-block B' where it is held by the slide J aforesaid in connection with the crank *d* of the throw-rod H of the aforesaid belt-shifter.

In pivotal connection with a bracket D', attached to the frame-brace Q', is a lever E' provided with a lug *x* carrying an anti-friction roller *x'* in the path of the cam-plate Y by which said lever is actuated against resistance of a spiral-spring *y*, which spring connects it with a depending lip of said bracket. The lower end of the lever E' is in shackle-union with a link E'' connected to an elevated arm F'' of a longitudinally slotted slide F', which arm is pivotally connected to the bed-piece I of the machine-frame. Engaging the slot of the slide is the screw threaded shank of a stop *z*, and a set-nut *z'* is run on said shank to hold the stop in adjusted position, said stop being in opposition to the cross-frame aforesaid. The cross-frame carries a cork-compressor G' in opposition to the cork-receiver C' aforesaid.

A bracket H' is held, by a set-screw or other suitable means in connection with an inwardly extending lateral arm I' of the machine-frame, and engaging an angular guide-extension of the bracket is a vertically adjustable jaw J' between which and another jaw J'' a series of corks are piled, as shown in Figs. 2 and 4. The jaw J'' has a slide-shank J''' adjustable on a lateral arm H'' of the bracket H', this shank and the cork-jaw J' being held in adjusted position by set-screws or other suitable means. Cork-stops K' are held in connection with the cork-receiver C', by screws or other suitable means.

In Fig. 2, the various movable parts of the machine are in the positions they assume at the completion of a corking operation, the crank-shaft M having made one-half of a revolution, during which time the slide F' has been moved from under the corks piled between the jaws J', J'', and during the next one-half revolution of said shaft, contraction of the spring *y* returns the lever E' to normal position with respect to the cam-plate Y, whereby said slide is actuated to move the opposing cork towards the stops K', there being sufficient clearance of the adjusted jaws J' to permit the operation, and said cork drops onto the head-block B' forward of the compressor G', as shown in Fig. 4. The time of the cam-plate Z is such that the cross-frame A' and said compressor are moved to normal position during the last one-half revolution of said crank-shaft, and in the meantime the spring *m* acts to lift the lever S and gage-plate U to their normal positions. At about the time of completion of the revolution of the crank-shaft M, the tripper *f* (automatically returned to normal position) opposes the clutch-bolt *e* to retract the same from engagement with the spur-wheel L, thus permitting said shaft to come to rest with the cork-plunger W in elevated normal position, shown in Figs. 3 and 4, the reciprocative and rotary parts of the machine, other than the drive-gear, being in the positions shown in Fig. 1. The corked receptacle having been removed, another receptacle is engaged (by hand) mouth on, with the nozzle C'' of the cork-receiver, thereby lifting the gage-plate U and parts in connection therewith to effect a clutching of the crank-shaft M and spur-wheel L, whereby the slide F' is moved outward, while the cross-frame A' and compressor G' attached thereto are moved inward to compress the cork previously dropped onto the head-block B', said cross-frame being actuated as a result of the descent of the cam-plate Z with the plunger W that operates to push the compressed cork the full depth of said nozzle against the contents of said receptacle, assuming that the receptacle has been properly filled. The air above the contents of the receptacle is expelled and escapes between the aforesaid nozzle and the neck of the aforesaid receptacle during the descent of the cork, and at about the time the plunger W completes its downstroke, the lever S is depressed to cause a full descent of the gage-plate U, that now operates as a stripper on the receptacle in synchrony with said plunger, the result being a gradual clearance of the nozzle C'' by the cork and expansion of this cork in the neck of said receptacle to stopper the same.

Cam-plates Y', cork-receivers C' and their nozzles C'', compressors G' and plungers W of different sizes may be interchangeably employed to accommodate the machines to corks of various diameters, the gage-plate U, slide-stop z and jaw J" being adjustable for the same purpose, said corks being relative, in size, to the diameter and depth of the necks of the receptacles to be stoppered.

Various changes of detail may be made in the machine without departure from the invention.

I claim:

1. In a corking-machine, the combination of a movable device in the path of a receptacle to be corked, a starting mechanism controlled by said device, a cork-passage engageable with the receptacle, a reciprocative plunger by which a cork is forced under compression through said passage into said receptacle, and means whereby the return of the movable device first aforesaid is had in synchrony with the working stroke of the plunger.

2. In a corking-machine, the combination of a starting-mechanism, a vertically reciprocative plate and means in connection with the same for actuating said starting-mechanism on lift of the plate, a cork-receiver having a depending nozzle for the engagement of a receptacle to be corked, the lift of said plate being a result of such engagement; and a reciprocative plunger by which a cork is forced under compression through said nozzle in synchrony with a return of the aforesaid plate to normal position, whereby said receptacle is stoppered and disengaged from the aforesaid nozzle.

3. In a corking-machine, the combination of a starting-mechanism, a vertically reciprocative plate and means in connection with the same for actuating said starting-mechanism on lift of the plate, an adjustable lift-limiting stop, a cork-receiver having a depending nozzle for the engagement of a receptacle to be corked, the lift of the said plate being the result of an engagement of said nozzle by the receptacle; and a reciprocative plunger by which a cork is forced under compression through said nozzle in synchrony with a return of the aforesaid plate to normal position, whereby said receptacle is stoppered and disengaged from the aforesaid nozzle.

4. In a corking-machine, the combination of a movable device in the path of a receptacle to be corked, a starting-mechanism controlled by said device, a cork-passage engageable with the receptacle, a reciprocative device by which a cork is compressed in said passage, a reciprocative plunger by which the compressed cork is forced through the aforesaid passage into said receptacle, and means whereby the return of the movable device first aforesaid is had in synchrony with the working stroke of the plunger.

5. In a corking-machine, the combination of a movable device in the path of a receptacle to be corked, a starting-mechanism controlled by said device, a cork-receiver engageable with the receptacle, a cork-magazine, means controlling feed of the corks one at a time from the magazine and for compressing the fed cork in the receiver, a reciprocative plunger by which the compressed cork is forced through said receiver into said receptacle, and means whereby the return of the movable device first aforesaid is had in synchrony with the working stroke of the plunger.

6. In a corking-machine, the combination of a starting-mechanism, a vertically reciprocative plate and means in connection with the same for actuating the starting-mechanism on lift of the plate, an adjustable lift-limiting stop, a cork-receiver having a depending nozzle for the engagement of the receptacle to be corked, the lift of said plate being the result of such engagement; a cork-magazine, means controlling feed of the corks one at a time from the magazine and for compressing the fed cork in the receiver, and a reciprocative plunger by which the compressed cork is forced through said nozzle in synchrony with a return of the aforesaid plate to normal position, whereby said receptacle is stoppered and disengaged from the aforesaid nozzle.

7. In a corking-machine, the combination of a starting-mechanism, a lever by which said mechanism is actuated, a suitably guided stem in pivotal union with the lever, a forked plate in connection with the other end of the stem, a spring arranged to resist full throw of said lever in a direction opposite its starting movement, a cork-receiver having a nozzle straddled by said plate, a reciprocative plunger by which a cork is forced under compression through said nozzle into a receptacle engaged therewith against the aforesaid plate, and an arm of the plunger shank operative on the aforesaid lever to retract said plate in synchrony with the plunger, whereby said receptacle is stoppered and disengaged from the aforesaid nozzle, the spring serving to return the lever to normal position.

8. In a corking-machine, the combination of a starting-mechanism, a lever by which said mechanism is actuated, an adjustable stop limiting starting throw of the lever, a suitably guided stem in pivotal union with said lever, a forked plate in connection with the other end of the stem, a spring arranged to resist full throw of said lever in a direction opposite its starting movement, a cork-receiver having a nozzle straddled by said plate, a reciprocative plunger by which a cork is forced under compression through said nozzle into a receptacle engaged therewith against the aforesaid plate, and an arm of the plunger-shank operative on the aforesaid lever to retract said plate in synchrony with the plunger, whereby said receptacle is stoppered and disengaged from the aforesaid nozzle, the spring serving to return the lever to normal position.

9. In a corking-machine, the combination of starting-mechanism, a cork-receiver having a nozzle, a drop-feed cork-magazine, a forked plate straddling the nozzle and provided with a suitably guided stem, a lever in pivotal connection with the stem and operative in one direction to actuate said starting mechanism, a slide normally supporting the corks in the magazine, stops on said receiver in the path of a cork cleared by the slide, a sliding frame carrying a compressor by which said cork is engaged with the aforesaid receiver, a reciprocative plunger operative on the compressed cork, arms extending from the shank of the plunger, a bar connecting the arms, a cam on the bar, a cam-opposing spring-controlled lever in connection with the aforesaid slide, another cam in connection with an arm of the plunger-shank controlling the aforesaid sliding-frame, this arm being also operative on the starting-lever to retract the aforesaid plate in synchrony with said plunger, and a spring arranged to be contracted by said starting-lever in order to return the same and parts therewith to normal position.

10. In a corking-machine, the combination of starting-mechanism, a cork-receiver having a nozzle, a drop-feed cork-magazine adjustable to corks of varying diameters, a forked-plate straddling the nozzle, a suitably guided stem with which the plate has adjustable connection, a lever in pivotal connection with said stem and operative in one direction to actuate the starting-mechanism, a slide normally supporting the corks in the magazine, a stop in adjustable connection with the slide, stops on said receiver in the path of a cork cleared by said slide, a sliding frame carrying a detachable compressor by which said cork is engaged with the aforesaid receiver, a reciprocative shank having lateral arms, a plunger in adjustable connection with the shank and operative on the compressed cork, a bar connecting said arms, a cam on the bar, a cam-opposing spring-controlled lever in connection with the aforesaid slide, another cam in connection with one of said arms and controlling the sliding frame, this arm being operative on the starting-lever to retract the aforesaid plate in synchrony with said plunger, and a spring arranged to be contracted by said starting-lever in order to return the same and parts therewith to normal position.

11. In a corking-machine, a bed-piece, a head-block therewith, a cork-receiver detachably supported in the head-block, a locking slide for said receiver, and means for adjusting the slide in and out of working position.

12. In a corking-machine, a cork-magazine comprising a guide-bracket and a support on which it is positioned, a cork-opposing jaw having adjustable engagement with the guide-portion of the bracket, an arm extending from said bracket, and another cork-opposing jaw having a slide shank adjustable on said arm.

In testimony that I claim the foregoing I have hereunto set my hand at Milwaukee in the county of Milwaukee and State of Wisconsin in the presence of two witnesses.

FERDINAND BARTHOLD.

Witnesses:
 H. E. OLIPHANT,
 GEORGE FELBER.